Nov. 7, 1933.                J. J. BAUMAN                1,934,608
                          REFRIGERATOR CONTROL
          Original Filed June 17, 1932        2 Sheets-Sheet 1

WITNESSES:
James K. Mosser
R. J. Ridge

INVENTOR
J. J. BAUMAN
BY  A. B. Reeves
ATTORNEY

Nov. 7, 1933.  J. J. BAUMAN  1,934,608
REFRIGERATOR CONTROL
Original Filed June 17, 1932   2 Sheets-Sheet 2

INVENTOR
J. J. BAUMAN
BY A. B. Reavis
ATTORNEY

Patented Nov. 7, 1933

1,934,608

UNITED STATES PATENT OFFICE 1,934,608

REFRIGERATOR CONTROL

John J. Bauman, Springfield, Mass., assignor to Westinghouse Electric & Manufacturing Company, East Pittsburgh, Pa., a corporation of Pennsylvania Original application June 17, 1932, Serial No. 617,909. Divided and this application June 8, 1933. Serial No. 674,917

7 Claims. (Cl. 62—4)

My invention relates to a control mechanism for refrigerating systems and it has for an object to provide a simplified mechanism that will be reliable in operation and inexpensive to manufacture. This is a division of my copending application, Serial No. 617,909, filed June 17, 1932 for Refrigerator control and covers the defrosting features of my invention.

In refrigerators of all classes and particularly in household types, it is desirable to maintain normally a predetermined mean temperature therein. For example, if it is desired to maintain the cooling unit or heat absorbing unit of the refrigerating system at a mean temperature of twelve degrees F., the control mechanism should be capable of automatically starting the operation of the refrigerating system whenever the cooling unit reaches a temperature of, for example, 20° F., and of stopping the operation of the system whenever the temperature of the cooling unit is reduced to, for example, 4° F. It is also desirable to be able to change this predetermined mean temperature at will and to operate the refrigerator periodically at a temperature sufficiently high to defrost portions of the system. In other words, to maintain the cooling or heat absorbing unit at a mean temperature which is sufficiently high to melt frost off the cooling unit which has accumulated thereon during operation at relatively lower mean temperature. These advantages are obtained by my novel control mechanism when applied to refrigerators having a cabinet compartment and a machine for producing refrigeration therein.

In practicing my invention I provide an electric switch for controlling the operation of the machine and a thermostatic element for actuating the switch in response to the cabinet compartment temperatures, whereby the compartment is maintained between predetermined high and low temperatures. Adjustments are provided on the control mechanism for changing these predetermined temperatures, which changes are made without the use of a complicated system of springs or other biasing devices. One of the temperature adjustments is readily accessible to the operator and changes the mean temperature to be maintained within the cabinet, the cabinet temperature being responsive to the temperature of the heat absorbing or cooling unit, as is well understood in the art. This adjustment has a plurality of positions corresponding to various mean cabinet and cooling unit temperatures and preferably has a position where the temperatures maintained within the cabinet and in the cooling unit are sufficiently high to defrost portions of the system such as, for example, the evaporator, with continuance of cycling to maintain a mean temperature or temperature range high enough to provide defrosting but low enough to prevent rapid food spoilage. For example, if the control mechanism does not automatically start the refrigerating system until the temperature of the cooling or heat absorbing unit is, for example, 42° F., and automatically stops the refrigerating system when the cooling or heat absorbing unit has a temperature of, for example, 30° F., the mean temperature will be such as to effect defrosting of the cooling or heat absorbing unit, but the resultant temperature in the cabinet will always be sufficiently low to retard food spoilage. For the purposes of this specification, the word "cycle" includes one active period of the refrigerating system plus either the preceding or succeeding inactive period of the refrigerating system; by continuance of cycling or continuous cycling is meant automatic starting and stopping of the system and involving a series of active periods alternated with inactive periods of the refrigerating system.

More particularly, my invention comprises a temperature control mechanism embodying a switch opened and closed by a rockable or tiltable member, the latter being operated by a member or lever movable in response to thermal conditions, together with means for advancing or retarding tilting or rocking of the tiltable or rockable member with respect to the operating range of movement of the movable member or lever. The movable member or lever is moved in one direction by biasing means, for example, a spring, and in the other direction by means, such as a bellows, responsive to temperature. The biasing means or spring may be adjusted to regulate the general desired setting of the mechanism, and further regulation may be secured by the advancing and retarding means to raise or lower the desired temperature. When the control mechanism is used to control a mechanically operated refrigerator, adjustment of the advancing and retarding means in the advance direction lowers the temperatures at which the switch is closed to secure operation and at which the switch is opened to interrupt operation, and adjustment in the retard direction has the contrary effect. By adjustment in this way of the temperatures at which the switch is closed and opened, it is possible to have a refrigerator operated at such a high temperature range that defrosting of the evaporator and associated elements may be effected with cycling thereof, whereby, during defrosting, the attainable upper temperature will be limited and food spoilage minimized. I also provide means for limiting motion of the temperature responsive movable member or lever so that, with the advancing and retarding adjustment means in full retarded position, closing of the switch is prevented, this being useful in effecting rapid defrosting; and also, I preferably provide means for limiting motion of the temperature responsive movable member or lever so that, with the advancing and retarding adjustment means in full advance position, opening of the switch is prevented, this being useful in effecting rapid freezing or cooling.

It is another object of my invention to provide a control mechanism for a mechanical refrigerator capable of regulation to obtain defrosting with continuance of cyclic operation.

It is a further object of the invention to provide a temperature control mechanism having adjusting means for advancing and retarding opening and closing of a switch relative to movement of the temperature responsive means.

It is a still further object of my invention to provide a temperature control mechanism for a refrigerator having a series of adjusted positions for cycling the machine to maintain progressively increasing temperatures within the refrigerator, the highest of which is effective to defrost the evaporator of the refrigerator.

It is a further object of my invention to provide a mechanical or electrical refrigerator with control mechanism capable of being adjusted to interrupt operation or to maintain continuous operation, or both.

These and other objects are effected by my invention as will be apparent from the following description and claims taken in connection with the accompanying drawings, forming a part of this application, in which:

Figure 1:
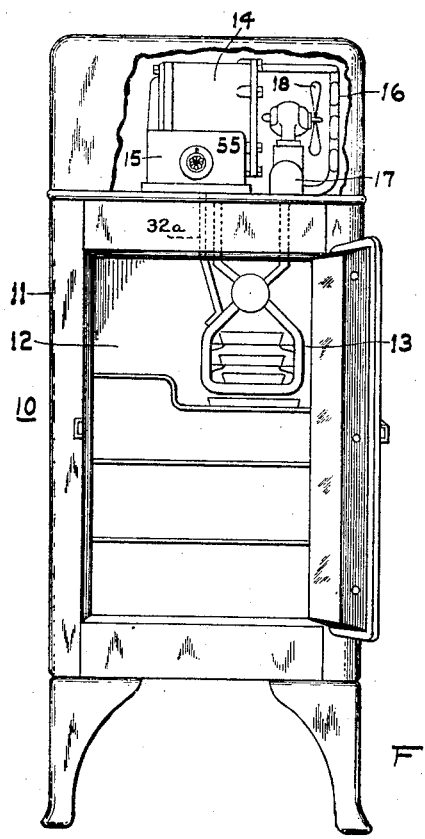
Fig. 1 is a view of a refrigerator having my control mechanism applied thereto.
Figure 4:
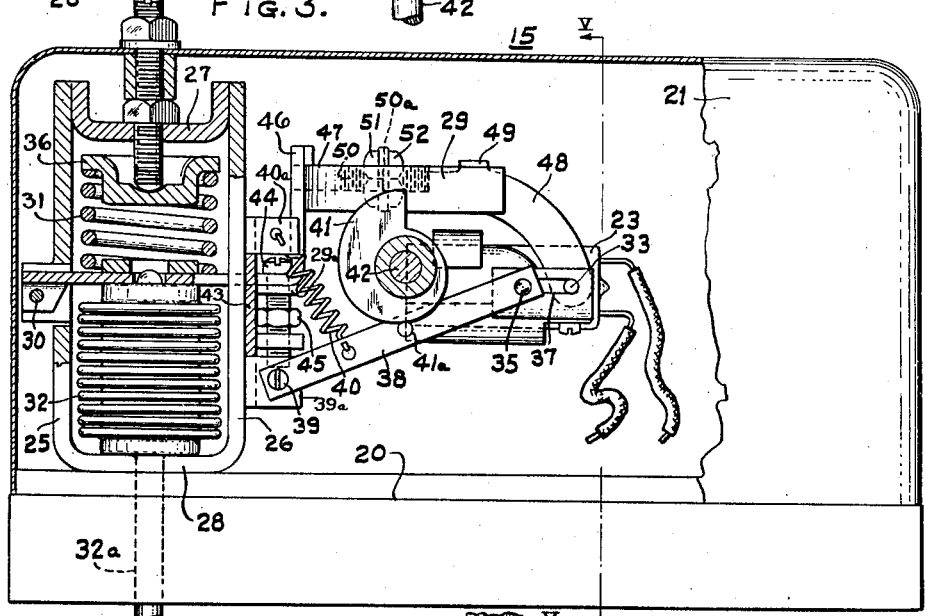
Fig. 4 is a view similar to Fig. 2 but with parts broken away.
Figure 5:
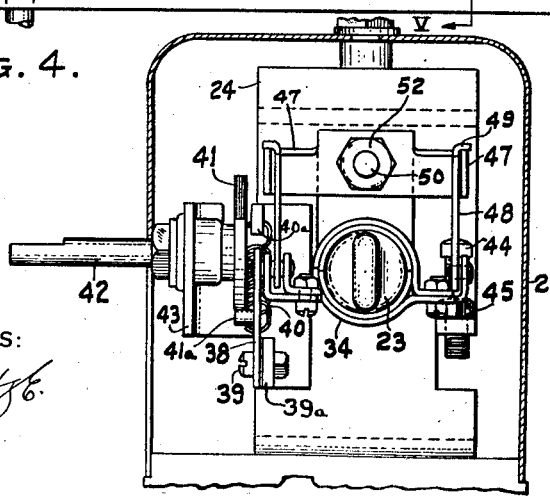
Fig. 5 is a section taken along the line V—V of Fig. 4.

Referring to Fig. 1, I show a refrigerator 10, including a cabinet 11, a cooling compartment 12, and an evaporator 13 in heat exchange relation therewith. A motor-compressor unit 14 for circulating refrigerant is preferably mounted on the cabinet 11 and is operatively controlled by a switch 23 (Fig. 4), included in the mechanism 15. The switch 23 closes and opens the electric circuit of the motor compressor unit 14 to initiate and terminate operation of the same. The well-known compression-expansion cycle is used to provide refrigeration within the cabinet 11. Refrigerant vapor is withdrawn from the evaporator 13 by the motor-compressor unit 14 and forced under pressure to a condenser 16 where it is condensed. The condensed refrigerant then passes through an expansion device 17 to the evaporator where it is vaporized, abstracting heat from the cooling compartment 12 in a well-known manner. The cycle is repeated so long as the motor-compressor unit 14 operates. A fan 18 may be used to circulate a cooling medium through the condenser to assist in cooling the refrigerant.

The control mechanism 15 includes a base 20 and a cover or hood 21 enclosing a suitable switch, for example, the fluid or mercury switch 23, which is opened and closed due to rocking or tilting movement of a rockable or tiltable member; mechanism operating in response to cooling unit temperature to rock or tilt the tiltable member to open and close the switch; and means, preferably manually operable or settable, to advance or retard closing and opening of the switch in response to movement of the mechanism due to cooling unit temperature.

The mechanism operating in response to cooling unit temperature includes a frame or pedestal 24 secured to the base 20 and consisting preferably of side members 25 and 26 and upper and lower cross members 27 and 28, respectively. A movable member, for example, a lever 29, is pivoted at 30 to the pedestal side member 25 and extends across the space between the side members and beyond the other side member 26. Biasing means, for example, a spring 31, exerts force on the movable member or lever and tends to cause it to move in one direction, and temperature responsive means, for example, the bellows 32, opposes the spring and causes the lever or movable member to move in the other direction against the force of the spring.

The temperature responsive means or bellows 32 has a tube 32a secured thereto, which tube 32a extends within the cooling compartment 12 and is subjected to the temperature of the cooling unit. The bellows 32 and tube 32a define a chamber within which a volatile gas is confined.

As the pressure of gas varies with the temperature of the cooling unit 13, the amplitude of the bellows 32 will depend on the pressure of the confined gas and incidental cooling means temperature.

Figure 6:
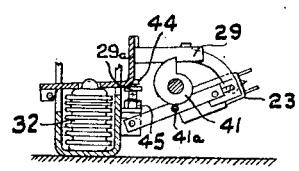
Figs. 6, 7 and 8 are diagrammatic views of parts of the mechanism in various positions.

The outer end of the lever 29 is pivotally connected at 33 to the rockable and tiltable member 34, which rocks or tilts about the fulcrum 35 to open and close the switch. It will, therefore, be apparent that change in temperature results in motion of the lever 29 and that this brings about tilting or rocking of the tiltable or rockable member 34 to open and close the switch. The positions assumed by the bellows 32, lever 29, and the switch 23 when the latter is open and closed are shown, respectively, in Figs. 4 and 6.

Preferably, as illustrated, the biasing means or spring 31 is arranged above the lever 29 and in the space between the latter and the upper cross member 27, the upper cross member carrying an adjustable follower 36 for adjusting the tension of the spring.

The bellows 32 is arranged underneath the lever and between the latter and the lower cross member 28 of the pedestal.

By varying the force or compression of the spring, the temperatures at which the switch is closed or opened may be raised or lowered. For example, if it is desired to set the control mechanism to close the switch at a lower temperature, the spring force is diminished and vice versa. The spring is adjusted for a normal operating condition and variability is secured by mechanism associated with the rockable or tiltable member 34, serving to advance or to retard opening and closing of the switch with respect to movement of the lever 29, and which will now be described.

Figure 7:
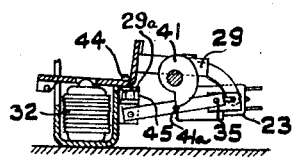

The adjustment for securing the advance and retard effect of opening and closing of the switch with respect to the operating range of movement of the temperature responsive member includes a longitudinal slot 37 provided in the rockable or tiltable member 34 and having the fulcrum pin 35 disposed therein. If the fulcrum pin is lowered, with the lever 29 in a given position, it will be apparent that the rockable member or cradle 34 will be moved angularly in a counter clockwise, or switch-closing, direction about the pivotal connection with the result that both opening and closing of the switch may be secured with lower pressure exerted by the bellows, and, therefore, with maintenance of lower temperature in the refrigerator. On the other hand, as the fulcrum pin 35 is raised, greater upward movement of the lever 29 is required to open and close the switch, with the result that the opening and closing temperatures are proportionately increased. In Fig. 7, the fulcrum pin 35 is shown in its lowermost position while in Fig. 8 it is in its uppermost position.

The fulcrum pin 35 is preferably raised and lowered for the purposes indicated by a lever 38 pivoted at 39 on extension 39a fixed to side member 26. The outer end of the lever 38 has a fulcrum pin 35 mounted thereon, the lever being biased upwardly by a spring 40 and being moved downwardly by a manually settable cam 41 cooperating with the pin 41a, the cam 41 having an operating shaft 42 carried by the bracket 43 attached to the pedestal structure. The spring 40 has one of its ends secured to an extension 40a which is fixed to side member 26. The cam has such a peripheral contour that the desired range of upward and downward movement of the fulcrum pin 35 is secured for desired operating conditions. Preferably, the cam is so designed and the other elements are so constructed and arranged that, when the fulcrum pin is in an upper position, the temperature at which the switch is opened and closed will be sufficiently high to assure of defrosting with continuation of cycling.

An upper adjustable abutment 44 cooperates with a projection 29a secured to and extending laterally from the lever 29 to limit upward motion thereof; and this abutment is preferably so adjusted that, with the portion of the cam of minimum radius cooperating with the lever pin 41a, the rockable or tiltable member cannot be moved in a counterclockwise direction sufficiently to close the switch. (See Fig. 8). Also, a lower abutment 45 preferably cooperates with the projection 29a of the lever 29 to limit downward motion of the latter, whereby, with the fulcrum pin 35 in its lowermost position, the lever 29 cannot move downwardly in a clockwise direction sufficiently to open the switch, this operation being desirable when most rapid cooling and freezing is desired. (See Fig. 7.)

The lever 29 includes means providing for adjustment of its length, whereby the pivotal connection thereof with respect to the tiltable or rockable member may be moved inwardly or outwardly from the fulcrum pin 35 to change the ratio of angular movement of the lever 29 to angular movement of the tiltable or rockable member necessary to open or close the switch. With lengthening of the lever, greater angular movement is necessary to secure movement of the rockable or tiltable member through a predetermined angle and vice versa. This adjustment makes possible variation of the temperature difference necessary to secure opening and closing of the switch. Preferably, in order to provide for this adjustment, the lever 29 has a vertically extending portion 46 to the upper end of which is connected the yoke 47. A movable yoke 48, has ears 49 cooperating with the first yoke to maintain the yokes in alignment. A screw 50 extends outwardly from the base portion of the yoke 47 and through an opening 50a provided in the base portion of the adjustable yoke 48, nuts 51 and 52 being arranged in opposite sides of the base portion of the yoke 48 and providing for securement of the yokes in any desired relative position.

Compactness of the apparatus is secured by overlapping of operating parts and by having all of the moving parts carried by a single standard or pedestal structure. It will be seen that the lever 29 extends upwardly and that the arms of the yoke 48 are curved outwardly and downwardly with the result that the outer ends of such arms may be connected to the outer end of the rockable member or cradle 34 disposed beneath the lever, whereby the lever and the cradle are disposed in overlapping relation.

Figure 2:
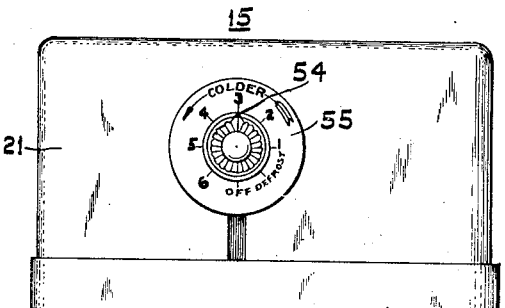
Fig. 2 is a front elevation of my novel control mechanism.
Figure 8:
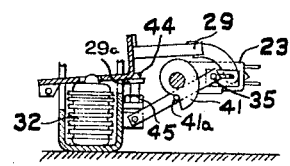
Figure 3:
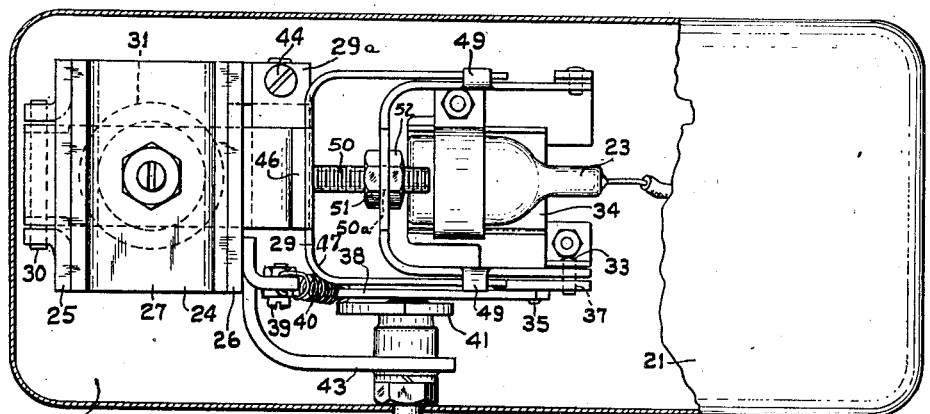
Fig. 3 is a plan with parts broken away of the apparatus shown in Fig. 2.

Referring to Fig. 2, a pointer 54 and a dial 55 are arranged exteriorly of the cover 21 for the convenience of the operator. Suitable markings are provided on the dial 55 to indicate conditions to be effected by the mechanism. From the structure hereinbefore described, it will be apparent that the cam is constructed and arranged to provide for the full range of different operating adjustments. When the cam portion of minimum radius bears on the pin 41a, the fulcrum pin 35 will be in its uppermost position, as shown in Fig. 8, in which position maximum expansion, corresponding to the highest temperature will be required in order to close the switch; and, if the abutment 44 is adjusted to limit upward movement of the lever 29, closure of the switch may be prevented. With a portion of the cam of somewhat larger radius bearing on the pin 41a, the fulcrum pin 35 will be lowered, with the result that opening and closing of the switch takes place at relatively high temperatures, which temperatures may be above that corresponding to the freezing point of water at the exterior surfaces of the evaporator and associated parts. With such an adjustment, defrosting may be effected with cycling of the refrigerator. As portions of the cam of increasing radius are caused to bear on the pin 41a, opening and closing of the switch takes place at lowered temperatures until minimum temperature conditions are reached when the cam portion of maximum radius is bearing on the pin 41a. With the cam portion of maximum radius bearing on the pin 41a and with suitable adjustment of the lower abutment 45, downward movement of the lever 29, in consequence of decreasing temperature, is limited so that there is insufficient movement of the lever to open the switch, with the result that the refrigerator may be operated continuously, without cycling, in order to effect quick cooling or freezing. Therefore, referring again to Fig. 2, the position indicated "defrost" is the position referred to above where a portion of the cam of small radius is effective to so adjust the mechanism that continuous cycling takes place with maintenance of the temperature above freezing; the positions indicated 1, 2, 3, 4, and 5 correspond to cam portions of increasing radius, which, as hereinbefore pointed out, provide for cycling of the refrigerator to maintain lower and lower temperatures; the position indicated "6" corresponds to a cam portion of still larger radius, as shown in Fig. 7, where the parts of the mechanism are so related that, due to cooperation of the lower abutment 45 with the lever 29, opening of the switch is prevented and continuous operation is secured without cycling; and the position indicated "off" corresponds to the portion of the cam of minimum radius, and is effective, due to the cooperation of the upper abutment 44, to prevent closure of the switch. (See Fig. 8.)

It will be apparent from the foregoing that I have devised a novel control mechanism for a mechanical refrigerator having a plurality of adjustments for changing the maximum and minimum operating temperatures of a refrigerator with an adjustment for changing the operating temperature range; all of said adjustments being of simple construction, each functioning without affecting the other and without the use of a complicated system of biasing devices. It will be seen also that I have provided a control mechanism wherein a plurality of positions for continuously cycling the refrigerating machine to maintain various mean cabinet temperatures are provided, one of which will effect defrosting of the evaporator and all of which are manually obtainable by a common adjusting means. I have shown my novel control mechanism applied to a compression type refrigerator, but it will be understood that other types of refrigerating machines may be controlled thereby.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. In a refrigerating system, the combination of a cabinet, an evaporator for absorbing heat from the cabinet, an intermittently operated refrigerating machine for circulating refrigerant through the evaporator and a mechanism adjustable to a series of positions for effecting continuous cycling of the machine at progressively increasing mean evaporator temperatures, the maximum mean temperature obtained by continuous cycling being effective to remove frost from the evaporator which has accumulated thereon at the lower mean evaporator temperatures.

2. In a refrigerating apparatus for preserving food-stuffs, the combination of a refrigerator cabinet, a cooling unit in the cabinet for absorbing heat therefrom, a refrigerating mechanism for circulating a refrigerant through the cooling unit, and a control mechanism for the refrigerating mechanism including means to effect cycling of the mechanism to maintain the cooling unit at relatively low refrigerating temperatures, whereupon frost incidentally accumulates on the cooling unit, and also including means to effect continuous cycling of the mechanism to maintain a relatively higher refrigerating temperature in the cooling unit sufficient to remove or to retard the accumulation of frost on the cooling unit, said latter temperature being sufficiently low to preserve food-stuffs.

3. In a refrigerating apparatus for preserving food-stuffs, the combination of a refrigerator cabinet, a cooling unit in the cabinet for absorbing heat therefrom, a refrigerating mechanism for circulating a refrigerant through the cooling unit, and a control mechanism for the refrigerating mechanism including means to effect cycling of the mechanism to maintain the cooling unit at relatively low refrigerating temperatures, whereupon frost incidentally accumulates on the cooling unit, and also including means to effect continuous cycling of the mechanism to maintain a relatively higher refrigerating temperature in the cooling unit sufficient to remove or to retard the accumulation of frost on the cooling unit, said latter temperature being sufficiently low for preserving food-stuffs and common means manually operable for obtaining either condition of operation of the refrigerating mechanism.

4. In a refrigerating apparatus for preserving food-stuffs, the combination of a refrigerator cabinet, a cooling unit in the cabinet for absorbing heat therefrom, a refrigerating mechanism for circulating a refrigerant through the cooling unit, and a control mechanism adjustable to a plurality of positions for cycling the mechanism to maintain the cooling unit at varying relatively low mean refrigerating temperatures, whereupon frost accumulates on the cooling unit, said control mechanism also having at least one additional position of adjustment to effect continuous cycling of the mechanism to maintain a relatively high mean refrigerating temperature in the cooling unit sufficient to remove or retard the accumulation of frost on the cooling unit, said latter temperature being sufficiently low for preserving food-stuffs.

5. In a refrigerating apparatus for preserving food-stuffs, the combination of a refrigerator cabinet, a cooling unit in the cabinet for absorbing heat therefrom, a refrigerating mechanism for circulating a refrigerant through the cooling unit, a control mechanism adjustable to a plurality of positions for cycling the mechanism to maintain the cooling unit at varying relatively low mean refrigerating temperatures, whereupon frost accumulates on the cooling unit, said control mechanism also having at least one additional position of adjustment to effect continuous cycling of the mechanism to maintain a relatively high mean refrigerating temperature in the cooling unit sufficient to remove or retard the accumulation of frost on the cooling unit, said latter temperature being sufficiently low for preserving food-stuffs, and manually adjustable means included in the control mechanism for obtaining either the relatively high or the relatively low refrigerating temperatures in the cooling unit.

6. In a refrigerating apparatus for preserving food-stuffs, the combination of a refrigerator cabinet, a cooling unit in the cabinet for absorbing heat therefrom, a refrigerating mechanism for circulating a refrigerant through the cooling unit, a control mechanism adjustable to a plurality of positions for cycling the mechanism to maintain the cooling unit at varying relatively low refrigerating temperatures, whereupon frost accumulates on the cooling unit, said control mechanism having at least one additional position of adjustment to effect continuous cycling of the refrigerating mechanism to maintain a relatively high refrigerating temperature in the cooling unit sufficient to remove or retard the accumulation of frost on the cooling unit, said latter temperature being sufficiently low to preserve food-stuffs and said control mechanism also having another additional adjustment to prevent cycling of the refrigerating mechanism, and manually adjustable means associated with the control mechanism for obtaining either the relatively high or the relatively low refrigerating temperatures or for stopping the refrigerating mechanism.

7. The method of operating a refrigerator for preserving food-stuffs, which refrigerator has a cooling unit in its cabinet maintained at a refrigerating temperature by a cyclically operated refrigerating machine, which method comprises normally cycling the refrigerating machine to maintain a relatively low refrigerating temperature in the cooling unit and incidentally accumulating frost on the cooling unit and continuously cycling the machine periodically to maintain a relatively higher refrigerating temperature in the cooling unit, which latter temperature is sufficiently high to effect defrosting of the evaporator and sufficiently low for preserving food-stuffs.

JOHN J. BAUMAN.

DISCLAIMER 1,934,608.—*John J. Bauman*, Springfield, Mass. REFRIGERATOR CONTROL. Patent dated November 7, 1933. Disclaimer filed March 31, 1936, by the assignee, *Westinghouse Electric & Manufacturing Company*.

Hereby enters this disclaimer to claims 1 to 5 inclusive and 7, of the above patent.
[*Official Gazette April 21, 1936.*]